United States Patent [19]

Coulvonvaux et al.

[11] Patent Number: 5,013,182

[45] Date of Patent: May 7, 1991

[54] SELF-ADJUSTING MOUNTING-BAND ASSEMBLY

[75] Inventors: Paul R. Coulvonvaux, Bruxelles; Eric L. VandeVeire, Lubbeek, both of Belgium

[73] Assignee: Donaldson Company, Inc., Minneapolis, Minn.

[21] Appl. No.: 334,065

[22] Filed: Apr. 4, 1989

[51] Int. Cl.$^5$ ............................................. F16B 2/06
[52] U.S. Cl. .................................... 403/30; 403/290; 403/344; 24/205
[58] Field of Search ................ 403/290, 344, 28, 30, 403/24; 24/20 S, 20 R, 19

[56] References Cited

U.S. PATENT DOCUMENTS

| 1,079,042 | 11/1913 | Duncan . | |
| 1,103,717 | 7/1914 | Walton et al. . | |
| 1,942,600 | 1/1934 | Hornung | 24/19 |
| 2,942,127 | 6/1960 | Harse | 24/19 X |
| 4,480,359 | 11/1984 | Koster | 24/205 X |
| 4,783,029 | 11/1988 | Geppert et al. | 403/344 X |

FOREIGN PATENT DOCUMENTS 2553155 4/1985 Japan ................................. 24/205

Primary Examiner—Peter M. Cuomo
Attorney, Agent, or Firm—Merchant, Gould, Smith, Edell, Welter & Schmidt

[57] ABSTRACT

A mounting-band assembly is disclosed for securing air filters in connection with engine-powered vehicles and equipment. The mounting-band assembly is directed to such band assemblies where the band is made of a material that has a different rate of thermal expansion than the material of the filter housing. The band assembly incorporates a spring for self-adjusting the forces between the band and the filter housing in response to the relative change in the sizes of the band and housing.

1 Claim, 2 Drawing Sheets

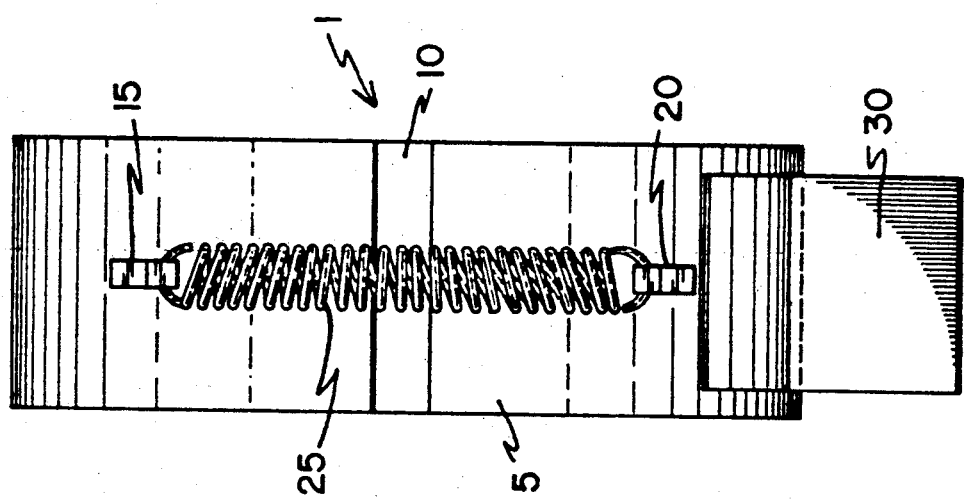
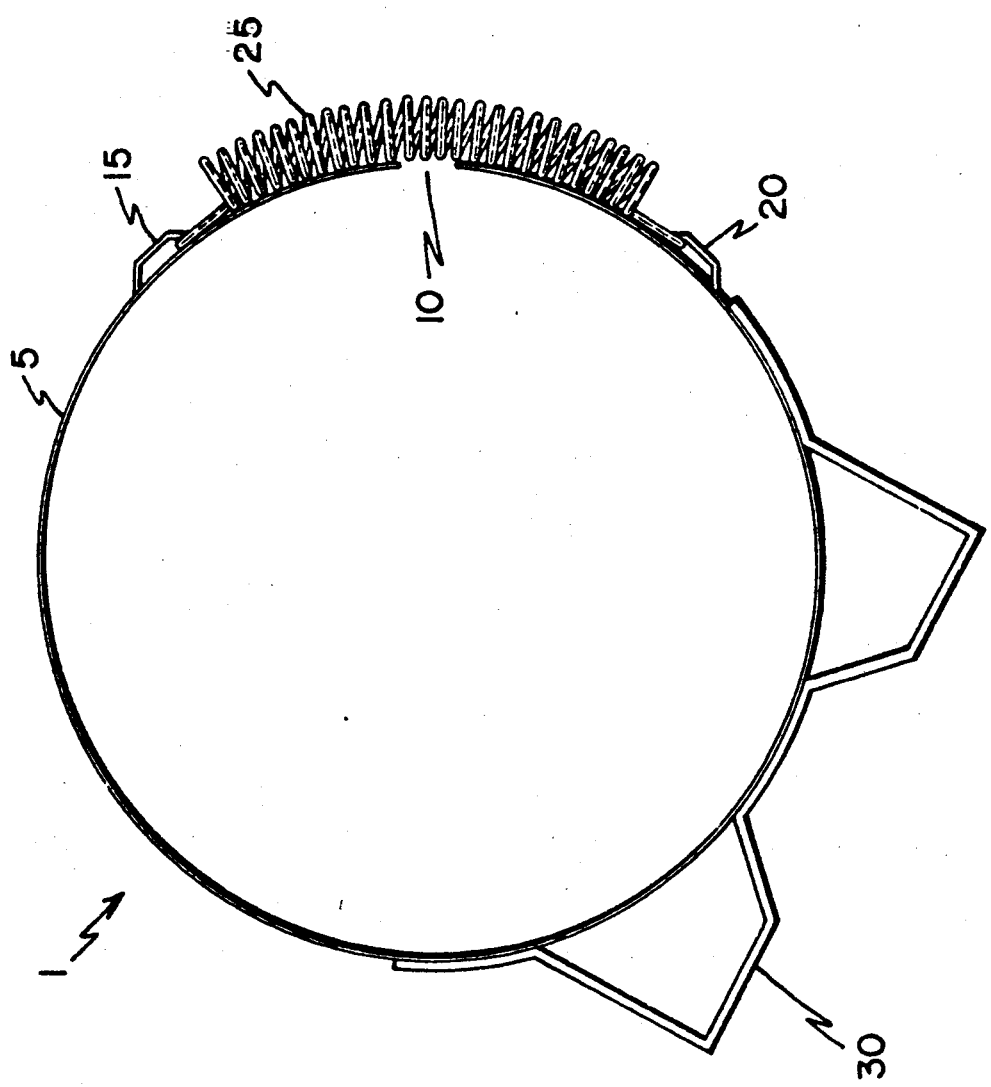

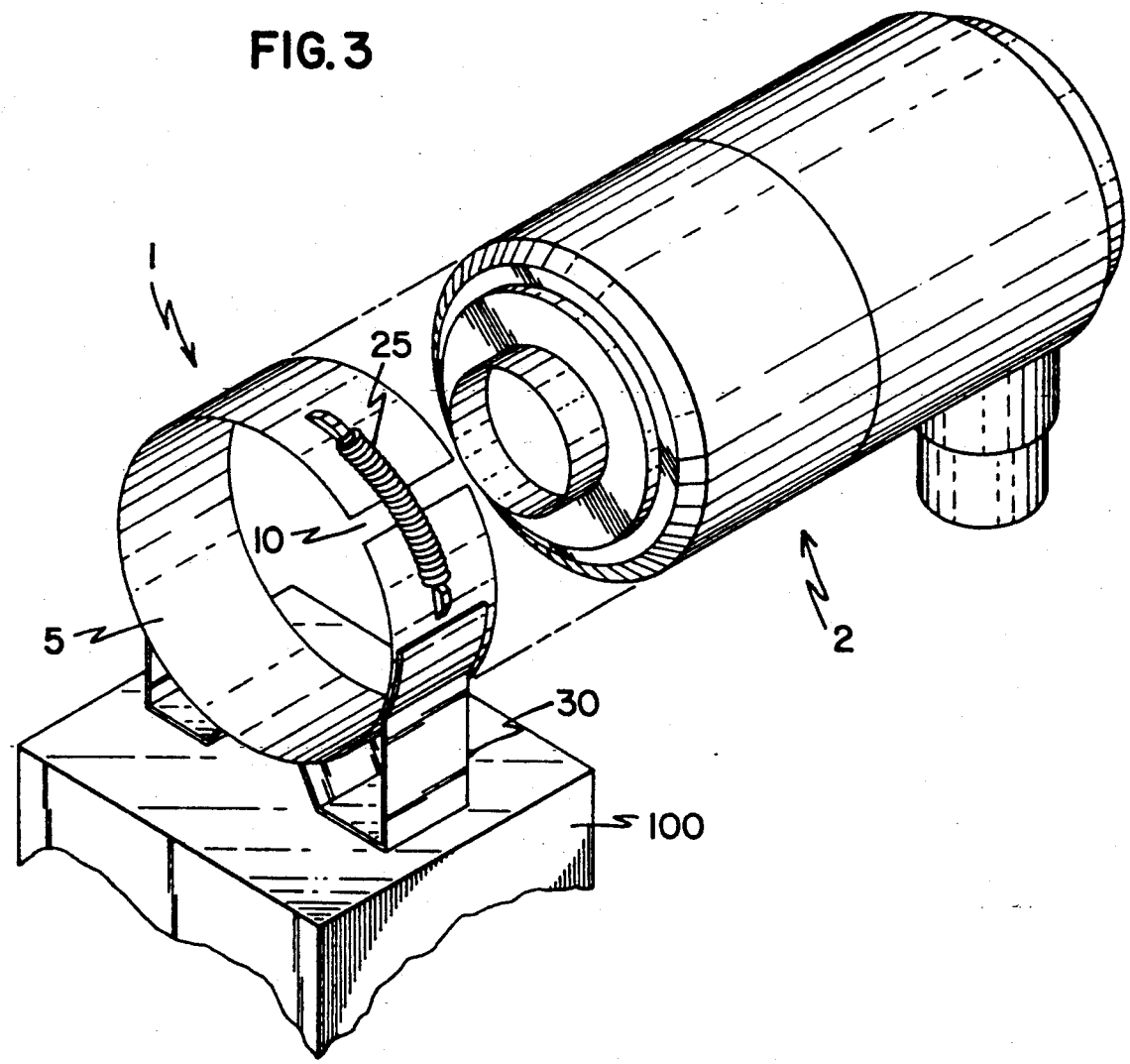

SELF-ADJUSTING MOUNTING-BAND ASSEMBLY

GENERAL FIELD OF INVENTION

This invention pertains generally to the field of mounting band assemblies that are used for securing air filters in connection with engine-powered vehicles and equipment. More particularly, the present invention is directed to such band assemblies where the band is made of a material that has a different rate of thermal expansion than the material of the filter housing.

BACKGROUND OF THE INVENTION

Many engines incorporate an air filter to clean the air stream that passes into the engine. These filters are commonly secured on structures that are physically proximate to the engine; for example, on the frame to which the engine is secured, to a nearby fire wall, or even to the engine itself. They are generally secured in a manner that allows them to be periodically removed and the filtering elements renewed. The filter generally includes an external housing and internal filter elements.

In one type of arrangement, the housing is secured to the surrounding structure by a mounting-band assembly, which is itself rigidly attached to the surrounding structure. Such band assemblies are very often constructed of metal, for reasons of durability, ease of fabrication, adequate mechanical properties, and so on. The mounting-band assemblies incorporate a discontinuous band that surrounds, and maintains an interference fit with, the periphery of the filter housing. Typically, the ends of the band have been secured by mechanisms such as an over-center clamp, or a bolt running between an ear on each end of the band.

In the past, such mounting-band assemblies have functioned to hold filter housings in place when the housing was constructed of metal. More recently, however, manufacturers have begun to construct filter housings out of was constructed of metal. More recently, however, manufacturers have begun to construct filter housings out of other materials, such as polymers. When such polymer housings are secured by the filter mounting-band assemblies that have heretofore been commonly used, the housings exhibit, over time, a narrowing, or pinched-in "waist," underneath the band.

The creation of this waist can progress to a point where the band assembly can no longer hold the housing firmly in place. Consequently, the housing rattles loose when the engine is operated, thereby bringing the service life of the housing to a premature end. Moreover, the uncontrolled motion of the now-loose filter with the band assembly is an usual operating mode, which subjects the band assembly to undesigned-for stresses. This, in turn, can result in the band assembly also failing prematurely.

One of the goals of the present invention is to solve this problem of securing polymer filter housings with metal mounting-band assemblies.

Engines are often subjected to substantial heat when in operation. For example, the engine itself generates a significant amount of heat when in operation, and then gradually cools when turned off. The engines also are often operated in ambient conditions that are quite hot. As a consequence, over periods of use the proximately-located mounting-band assembly and filter housing will also be subjected to heating and cooling.

These heating cycles apparently did not pose a great problem when both the band assembly and housing were made of metals with similar thermal expansion rates. In such an arrangement, as the housing enlarged during heating, the band assembly would also enlarge to approximately the same extent. Consequently, the forces between band assembly and housing apparently would stay within acceptable limits.

The polymer materials now being used in filter housings, however, have properties that are different from the previous metal materials. In particular, the polymer materials have a different, greater thermal expansion rate than the previous metal materials. Thus, as a polymer housing and metal mounting-band assembly are heated during the operation of the engine, the housing will expand significantly more than the metal of the band. This will greatly increase the forces between the filter housing and an ordinary mounting-band assembly.

The polymer materials also have a tendency to cold flow. Thus, when a polymer housing is heated and then pressed by a more slowly-expanding, non-adjusting band assembly, the housing will deform by expanding more in those regions where it is not constrained by the band. When the filter housing cools, the polymer will retain at least part of this deformed shape. As the filter housing undergoes repeated heated and cooling cycles, it will continually deform further, to the point where it can no longer be securely retained by the band.

SUMMARY OF THE INVENTION

To alleviate these problems, the present invention provides a mounting-band assembly that automatically adjusts its size to accommodate the expanding or contracting size of the housing. The self-adjusting capability of the band assembly is independent of whether the material of the band is undergoing the same rate of thermal expansion as the material of the filter housing. The band assembly maintains a pressure on the filter housing that is sufficient to securely hold the housing onto the engine. The pressure, however, is low enough to prevent or minimize the cold flow of the polymer filter housing, thus extending the life of the filter housing and the band assembly. With these aspects in mind, there will now be described a particular embodiment of the present invention. It should be understood, of course, that the precise embodiment described is by way of example only, and should not be taken as unduly limiting the true scope of the inventive concept.

BRIEF DESCRIPTION OF THE DRAWINGS

FIG. 1 is an end view of a self-adjusting mounting-band assembly embodying the principles of the present invention;

FIG. 2 is a side view of the same band assembly.

FIG. 3 is an isometric view of the band assembly and a representation of the type of filter housing that it is designed to secure.

DESCRIPTION OF THE PREFERRED EMBODIMENT

Referring now to the figures in greater detail, the illustrated mounting-band assembly (1) that embodies the present invention includes a band (5). The band is preferably made of a metal or other suitable material. As best seen in FIGS. 1 and 3, the band defines an almost closed shape, which advantageously should match the outside contour of the filter housing (2). The band is thin enough to be somewhat flexible in the directions contained within the plane of FIG. 1. It is wide enough, as shown in FIGS. 2 and 3, however, to provide ample support and rigidity to the filter housing.

Rigidly attached to the band (5) is a bracket (30), which in turn is adapted to be rigidly attached to the surrounding support structure (100), as shown schematically in FIG. 3. The bracket can be attached to both the support structure and the band by any known means, such as welding, or by threaded members, or the like. It is preferably attached to the support structure and the band at a number of points that are widely-enough spaced so that the band will not vibrate appreciably in relation to the support structure when the engine is in operation.

The band (5) is discontinuous at a gap (10). Because of this gap and the flexibility of the band it is possible, by moving the ends of the band that abut the gap toward or away from each other, to adjust the length of the perimeter of the closed shape that the band defines.

Formed in the band near each end thereof are loops (15), (20). These loops are suitable to receive the ends of a spring (25), as shown in the drawing figures. The spring is of such a length that it normally urges the ends of band (5) toward each other, tending to close gap (10) and reduce the perimeter of the band's closed shape. Preferably, at least one end of the spring (25) and its associated loop (15), (20) are configured so that the end of the spring may be detached from the band, to thereby facilitate the removal and installation of the filter housing.

In use, the filter housing (2) is placed within the perimeter of the band (5) by either stretching or removing spring (25). The spring is then replaced to the position shown in the drawing figures. The tension applied by the spring causes the band to collapse until it engages the filter housing with an interference fit. If the spring has been properly selected, the band will engage the housing with sufficient force to hold the housing firmly in place when the engine is operated.

As the filter housing and the band are heated, both the filter housing and the material from which the band has been constructed will expand. If the circumstances are such that the filter housing expands more than the band, the spring (25) will then elongate to self-adjust the size of the band to match the size of the now-expanded housing.

In this way, the forces between the band and the housing will stay practically constant, varying essentially only by the minor amount caused by the increasing deformation of the spring. This increase is substantially less than the increase that would occur in a band assembly using a non-adjustable band, since the spring can be made to elongate more per unit force than the metal of the band.

By configuring the self-adjusting mounting-band assembly so that the pressure applied by the spring through the band is only enough to ensure that the filter housing is adequately secured, the tendency of the material in the filter housing to cold flow can be minimized or eliminated. This, in turn, has proven to increase the service life of the filter housing, and should increase the life of the band assembly as well.

It should be apparent that one of ordinary skill could make numerous changes from the precise embodiment described without departing from the inventive concept that has been herein disclosed. Accordingly, the foregoing discussion should be considered by way of example only. Therefore,

What is claimed is:

1. A mounting band assembly comprising:
   a. a filter housing constructed of a material having a first rate of thermal expansion;
   b. a band encircling the exterior of the filter housing, the band constructed of a material having a second rate of thermal expansion that is different from said first rate of thermal expansion;
   c. securing means for securing the band to a support structure; and
   d. self-adjusting means for enabling the band to maintain a constant pressure on the filter housing as the housing and the band expand and contract during heating and cooling, thereby allowing the housing to return to its original configuration upon each return to a cool condition;
   wherein the pressure that is applied by the band and maintained by the self-adjusting means has been calculated to minimize the permanent deformation of the filter housing; and
   wherein the mounting band is discontinuous, thereby defining two ends, and wherein the self-adjusting means draws the two ends of the band together with a constant force throughout a range of relative positions of the ends; and
   wherein the self-adjusting means is a spring with two ends, each end of the spring being secured to one of the ends of the band, such that different thermal expansion of the band material and the housing material results in the spring progressively extending and contracting.

* * * * *

UNITED STATES PATENT AND TRADEMARK OFFICE
CERTIFICATE OF CORRECTION

PATENT NO. : 5,013,182

DATED : May 7, 1991

INVENTOR(S) : Paul R. Coulvonvaux and Eric L. VandeVeire

It is certified that error appears in the above-identified patent and that said Letters Patent is hereby corrected as shown below:

In Column 2, lines 43, 44, 45, 46, 47 and 48, "With these aspects in mind. . . ." should be a new paragraph.

Signed and Sealed this

Twenty-sixth Day of January, 1993

Attest:

STEPHEN G. KUNIN

Attesting Officer     Acting Commissioner of Patents and Trademarks